Figure 1:
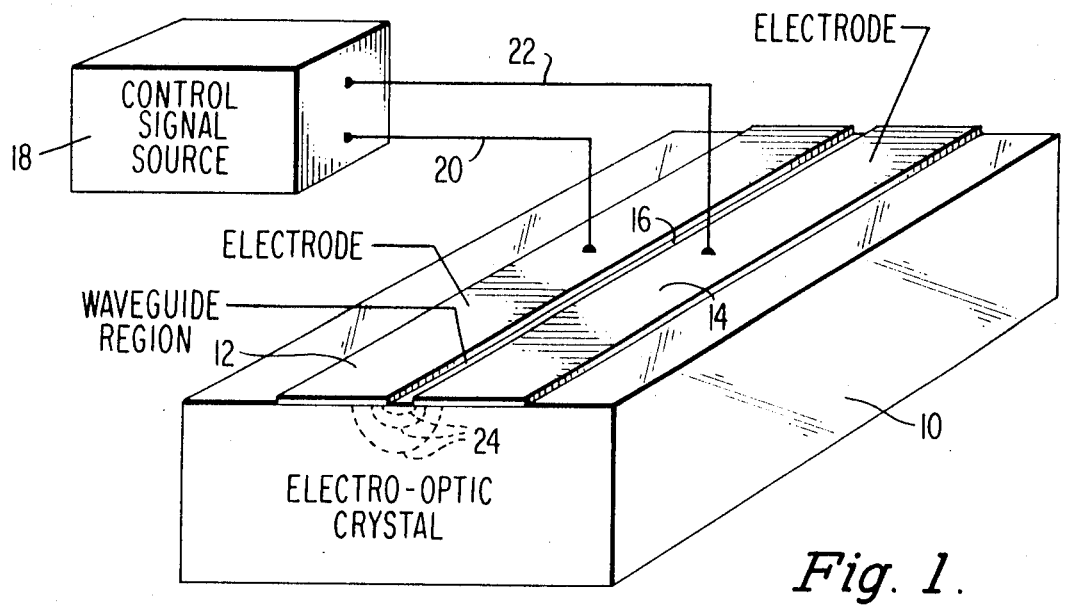

OR    3,795,433

United Sta [11] 3,795,433
Channin [45] Mar. 5, 1974

[54] VOLTAGE INDUCED OPTICAL WAVEGUIDE MEANS

[75] Inventor: Donald Jones Channin, Cranbury, N.J.

[73] Assignee: RCA Corporation, New York, N.Y.

[22] Filed: May 22, 1972

[21] Appl. No.: 255,660

[52] U.S. Cl.............. 350/96 WG, 350/160 R
[51] Int. Cl............... G02b 5/14, G02f 1/26
[58] Field of Search ............... 350/96 WG

[56]     References Cited
         UNITED STATES PATENTS
3,695,745   10/1972   Furukawa..................... 350/96 WG
3,395,366   7/1968    Snitzer et al. ............. 350/96 WG X OTHER PUBLICATIONS
Ash et al. "Switchable Optical Waveguide", IBM Technical Disclosure Bulletin, Vol. 14, No. 3, Aug. 1971, pp. 999–1000.

*Primary Examiner*—John K. Corbin

[57]     ABSTRACT
The increase of the refractive index in one or more localized regions defined by spaced electrodes on a surface of an electro-optic crystal, in response to a voltage across the electrodes, provides voltage-induced optical waveguide means. By controlling the voltage and/or the configuration of the electrodes, complex optical translating systems can readily be constructed.

14 Claims, 5 Drawing Figures

VOLTAGE INDUCED OPTICAL WAVEGUIDE MEANS

This invention relates to optical waveguide means and, more particularly, to voltage-induced optical waveguide means. One embodiment of such a voltage-induced optical waveguide is described in the article "Voltage-Induced Optical Waveguide," written by me and appearing on pages 128–130 of the Sept. 1, 1971 issue of Applied Physics Letters (Volume 19; No. 5).

It has been found that an optical waveguide may be formed by increasing the refractive index in a localized region of an electro-optic crystal, such as $LiNbO_3$, which is substantially transparent to light wave energy. For crystals with a positive electro-optic coefficient, this takes a positive going potential gradient, and with a negative electro-optic coefficient a negative-going potential gradient. The localized region may be defined by a pair of spaced electrodes disposed on the surface of the crystal and arranged in side-by-side relationship with respect to each other so that the voltage gradient which exists in the region in response to a suitable voltage being applied across the pair of electrodes is sufficient to raise the index of refraction within the region of the crystal with respect to the index of refraction of the crystal outside of the region by an amount sufficient to result in the region operating as an optical waveguide.

For many crystals, such as $LiNbO_3$, the magnitude of the electro-optic coefficient depends on the polarization light wave energy propagated therethrough, and is different for different light polarizations. Therefore, a light waveguide in a region of such an electro-optic crystal may act as a polarization selector passing one or both orthogonal polarization components of applied light wave energy depending on the magnitude of the applied voltage gradient, and have a different mode structure for the different polarizations.

Electrodes may be deposited onto the surface of a piece of crystal of bulk electro-optic material by using standard photo-lithography, such as that employed in making printed circuits. Further, by controlling the voltage and/or the configuration of the electrodes on the surface, complex optical translating systems, such as switching, gating, filtering, modulating, and impedance transforming systems, can readily be constructed.

Figure 2:
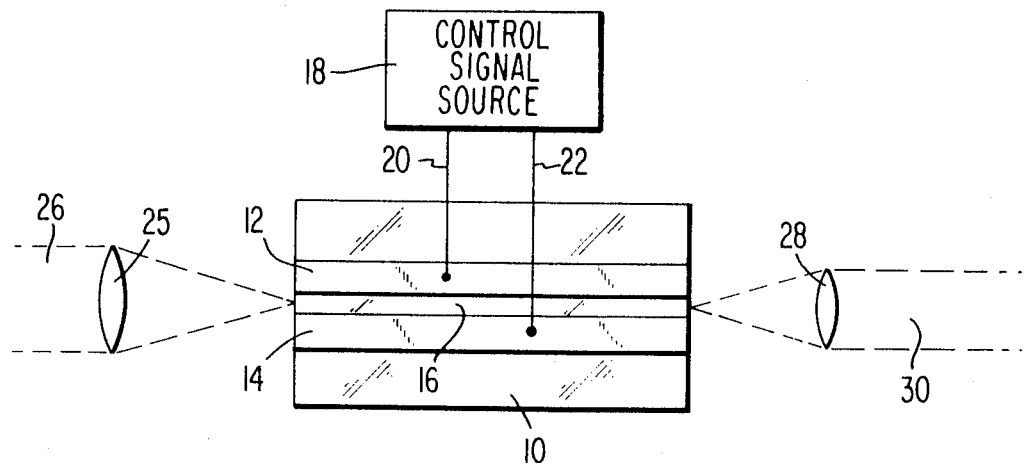
Figure 4:
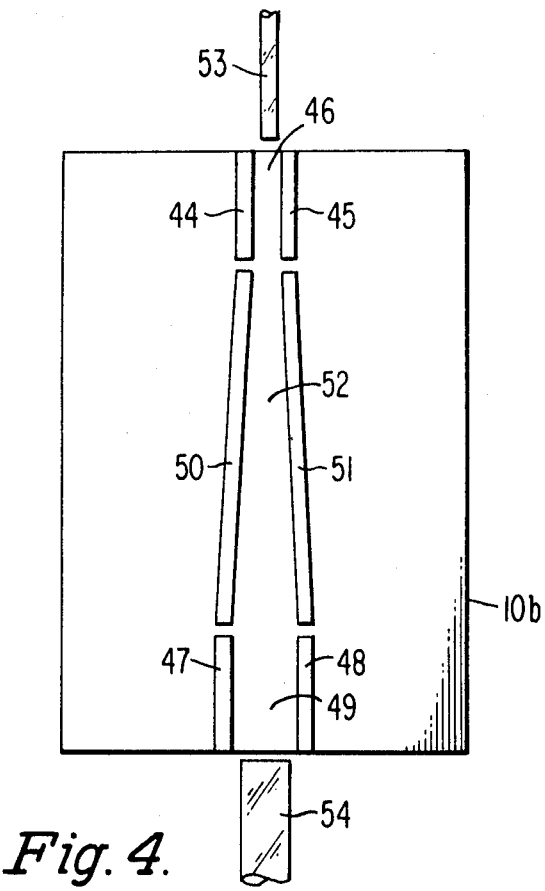
Figure 3:
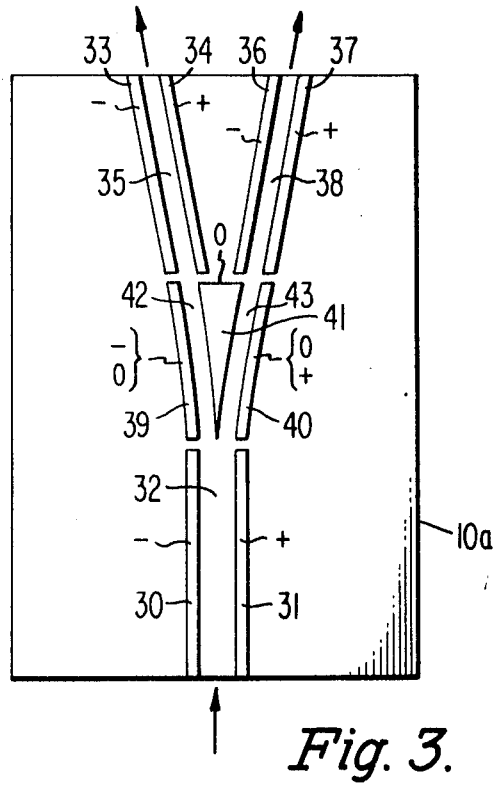
Figure 5:
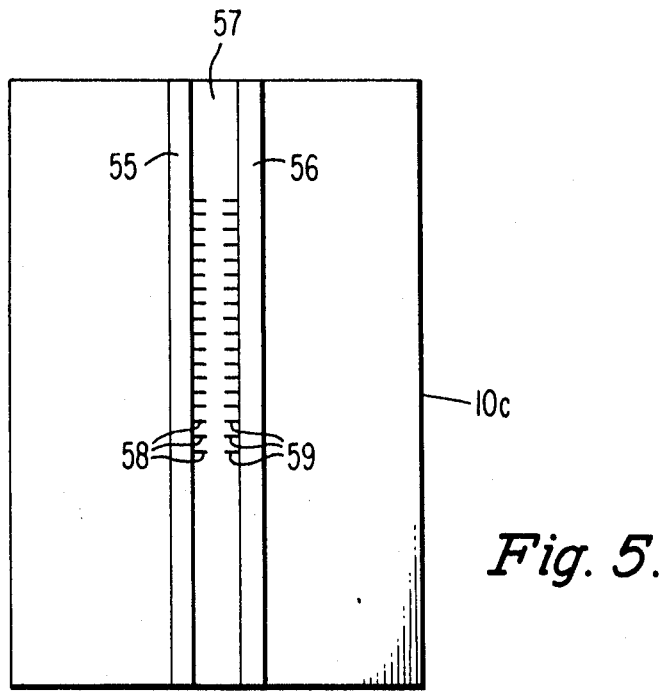

These and other features and advantages of the present invention will become apparent from the following detailed description taken together with the accompanying drawing, in which:

FIG. 1 schematically illustrates a first embodiment of the present invention, including a pair of spaced electrodes on the surface of an electro-optic crystal configured to operate as a simple optical waveguide;

FIG. 2 schematically illustrates one manner of applying input light wave energy to one end of the optic waveguide of FIG. 1 and for extracting output light wave energy from the other end thereof;

FIG. 3 schematically illustrates an electrooptic crystal, including spaced electrodes on a surface thereof configured to operate as an optical switching system for forwarding light wave energy from a first to either a second or third optical waveguide which may be substituted for the electro-optic cyrstal of FIG. 1;

FIG. 4 schematically illustrates an electro-optic crystal, including spaced electrodes on a surface thereof configured to operate as an optical impedance transformer between a relatively narrow input fiber optic and a relatively wide output fiber optic, which may be substituted for the electro-optic crystal of FIG. 1, and FIG. 5 illustrates an electro-optic crystal, including spaced electrodes having a periodic structure for operating as a filter, which may be substituted for the electro-optical crystal of FIG. 1.

Referring to FIG. 1, there is shown a piece of electro-optic crystal, such as $LiNbO_3$, which is transparent to a given light wave energy. Deposited on the top surface of crystal 10 is a pair of spaced parallel electrodes 12 and 14. Electrodes 12 and 14 define therebetween a localized dielectric region 16 of crystal 10. Control signal source 18 is capable of deriving at least one control voltage which is applied across electrode 12 and 14 by conductors 20 and 22, respectively. (As will be discussed in detail in connection with FIGS. 3 and 4, control voltage source 18 may provide a plurality of voltage sources.) In any given case, the voltage supplied by control signal source 18 to electrodes 12 and 14 may be alternatively either D.C. or A.C. and have an amplitude which alternatively is constant or time-varying. As indicated by dashed lines 24, the voltage gradient between electrodes 12 and 14 establishes an electric field within the dielectric of crystal 10 within and in the vicinity of region 16. Although the absolute intensity of this electric field depends upon the magnitude of the voltage between electrodes 12 and 14, the relative field strength (or voltage gradient), as indicated by the spacing between adjacent ones of dashed lines 24, is always highest at the top surface of crystal 10 directly in between the proximate edges of electrodes 12 and 14 and then becomes lower with either increasing depth into crystal 10 or distance away from the proximate edges of electrodes 12 and 14.

FIG. 2, in addition to showing crystal 10, electrodes 12 and 14, region 16, control signal source 18, and conductors 20 and 22, also shows means for applying given light wave energy at an input to one end of region 16 and means for extracting this given light wave energy from the other end of region 16. Specifically, convex lens 25 is situated so that when it is illuminated by beam 26 of given light wave energy, the left end of region 16 lies in the image plane of lens 25 resulting in the light wave energy of beam 26 being focused on the left end of region 16. In the particular case shown in FIG. 2, beam 26 is collimated. Therefore, in this case, the image plane of lens 25, is the focal plane of lens 25. However, in the general case (not shown) where beam 26 is not collimated, but is either converging or diverging, the image plane of lens 25, will not coincide with focal plane of lens 25. In a similar manner, by locating the right end of region 16 in the focal plane of convex lens 28, the diverging beam of light wave energy emanating from the right end of region 16 may be collimated into output beam 30.

Lenses 25 and 28 are merely examples of respective means for applying and extracting light wave energy from region 16. As is known in the art, prisms, diffraction gratings and holographic couplers may be substituted for lens 25 and/or lens 28. Furthermore, rather than coupling an externally generated light wave energy into crystal 10, a light source, such as a solid state laser, may be incorporated directly in the wave guide structure. Similarly, an opto-electronic device, such as a phototransistor, may be directly incorporated into the guide to provide an electrical signal output.

The operation of the optical waveguide shown in FIGS. 1 and 2 will now be discussed. As is known, when light traveling in a medium of relatively high index of refraction impinges on a boundary between this medium of relatively high index of refraction and a medium of relatively low index of refraction, the light is totally reflected only if its angle of incidence at the boundary is equal to or exceeds a so-called critical angle. The sine of the critical angle is equal to the ratio of the relatively low index of refraction to the relatively high index of refraction. In any dielectric waveguide, the angle of incidence depends both on the mode of the input light wave energy applied to the waveguide and the value of the relatively high index of refraction of the dielectric thereof.

In an electro-optic crystal, such as crystal 10, there is no sharp boundary between a region of high index of refraction and of low index of refraction. However, as long as the voltage gradient between electrodes 12 and 16 exceeds a certain minimum value, which is a function of both the electro-optic coefficient of crystal 10 and the mode of light wave energy initially coupled into region 16 at the left end thereof, the light wave energy is confined by total reflection to region 16 as it travels from the left end thereof to the right end thereof. The effective depth of region 16 and, to a lesser extent, the effective width of region 16 in which total reflection takes place is not a constant but varies as a direct function of the value of the applied voltage across electrodes 12 and 14.

Because actual electro-optic crystals have relatively small electro-optic coefficients, it is normally necessary to provide relatively high voltage gradients, such as in the order of 1 million volts per meter in $LiNbO_3$, to achieve a sufficient amount of change in th index of refraction thereof. In order to accomplish this with a voltage of reasonable value, it is desirable to make the width of region 16 between the proximate edges of electrodes 12 and 14 quite small. For instance, this width may be only 70 micrometers. To prevent arcing between electrodes 12 and 14 in response to the applied voltage thereacross, it is desirable to varnish the electrodes. Further, the application to portions of crystal 10 of high direct current voltage gradient has the tendency to permanently change the refractive index of these portions of crystal 10. In order to prevent this, an A.C. voltage, such as a cycle time wave, may be applied by control signal source 18 across electrodes 12 and 14. However, in this case region 16 will act as a waveguide only during portions of each positive half cycle.

The simple voltage-induced waveguide of FIGS. 1 and 2 can function in various ways in accordance with the type of voltage that is applied across electrodes 12 and 14 by control signal source 18. For example, if either a fixed D.C. voltage or a fixed amplitude A.C. voltage of appropriate magnitude is applied across electrodes 12 and 14, the waveguide provided by region 16 operates merely as an optical transmission line. However, if control signal source 18 is operated to switch the voltage on and off in accordance with a digital signal, a digital modulator is achieved in which light wave energy is transmitted from the left end to the right end of region 16 only during the time intervals in which control signal source 18 switches on the voltage across electrodes 12 and 14. During the remaining intervals, when no voltage is applied between electrodes 12 and 14, light incident on the left end of region 16 is scattered throughout crystal 10 and does not emerge from the right end of region 16.

By controlling the amplitude of the voltage applied from control signal source 18 to electrodes 12 and 14 in accordance with an analog signal, the waveguide of FIGS. 1 and 2 can operate as an analog modulator. In this case, for the reasons discussed above, the effective boundary of region 16 will vary with the instantaneous amplitude of the applied analog voltage signal, the depth of region 16 being greater with relatively high amplitude signals than with relatively low amplitude signals. This results in only a portion (which varies in size with the instantaneous value of the analog signal) of the spot of focused input light wave energy incident on the left end of crystal 10 being within the boundary of region 16 and the remaining portion falling outside of the boundary. Only this portion within the boundary is transmitted through the waveguide to the right end thereof, the remaining portion being scattered throughout crystal 10. Thus, the intensity of the output light wave energy varies in accordance with the analog voltage signal applied across electrodes 12 and 14.

By employing more complicated configurations of spaced electrodes on the surface of an electro-optic crystal than the simple pair of parallel electrodes shown in FIGS. 1 and 2, more complex optical waveguide systems can be constructed. Three different examples of such complex optical waveguide systems are shown in each of FIGS. 3, 4 and 5. The systems of each of FIGS. 3, 4 and 5 are intended only to be illustrative of such complex optical waveguide systems that can readily be constructed employing the principles of the present invention, and not to be construed as limiting.

Referring to FIG. 3, there is shown electro-optic crystal 10a which may be substituted for electro-optic crystal 10 in FIGS. 1 and 2. Disposed on the surface of crystal 10a is a first pair of spaced electrodes 30 and 31 defining a dielectric region 32 therebetween, a second pair of spaced electrodes 33 and 34 defining a dielectric region 35 therebetween, and a third pair of spaced electrodes 36 and 37 defining a dielectric region 38 therebetween. Coupling electrode 30 to electrode 33 is first additional electrode 39 which extends therebetween. Coupling electrode 31 to electrode 37 is second additional electrode 40 which extends therebetween. The third additional electrode 41, which is triangular in shape, has one side thereof in cooperative relationship with the ends of electrodes 34 and 36 of the apex of the angle opposite to this one side situated at a point intermediate the ends of electrodes 30 and 31, as shown.

First additional electrode 39 and third additional electrode 41 are spaced from each other to define a dielectric region 42 therebetween which extends from dielectric region 32 of the first pair of electrodes to dielectric region 35 of the second pair of electrodes. Similarly, second additional electrode 40 and third additional electrode 41 are spaced from each other to define dielectric region 43 therebetween which extends from dielectric region 32 of the first pair of electrodes to dielectric region 38 of the third pair of electrodes. Additional electrodes 39, 40 and 41 can be considered to be entirely included within a central area of the surface of crystal 10a from which the first, second and third pairs of electrodes radiate.

The configuration of FIG. 3 may be employed as a waveguide switch for switching light wave energy from region 32 of the first pair of electrodes to either region 35 of the second pair of electrodes or region 38 of the third pair of electrodes.

Considering the operation of the system shown in FIG. 3, if a suitable voltage is applied across electrodes 30 and 31 of the first pair of electrodes (as indicated by the minus and plus signs) from a control signal source, such as control signal source 18 of FIGS. 1 and 2, and input light wave energy is applied to the lower end of region 32, as indicated by the bottom arrow, this light wave energy will be transmitted through the waveguide defined by region 32 to the upper end thereof in the manner described in connection with the optical waveguide of FIGS. 1 and 2. Light wave energy arriving at the upper end of region 32 of the first pair of electrodes may alternatively be transmitted through region 42 to region 35 of the second pair of electrodes or through region 43 to region 38 of the third pair of electrodes, in particular, by applying a reference potential to electrode 41 and selectively applying a negative potential to electrode 39 and a reference potential to electrode 40, as indicated in FIG. 3, region 42 will act as an optical waveguide and region 43 will not. Therefore, the light wave energy emanating from the top of region 32 will be transmitted solely into region 42, and after transmission therethrough, will enter region 35 of the second pair of electrodes. As indicated in FIG. 3, a suitable voltage is applied across electrodes 33 and 34, so that the light wave energy intering the lower end thereof is transmitted therethrough and emanates from the upper end thereof, as indicated by the top-left arrow.

On the other hand, if a reference potential is selectively applied to electrode 39 and a positive potential is selectively applied to electrode 40, light wave energy emanating from the upper end of region 32 will be transmitted solely through region 43 and region 38 of the third pair of electrodes. In this latter case, the light wave energy will emanate from the upper end of region 38, as indicated in FIG. 3 by the upper-right arrow.

Referring now to FIG. 4, there is shown electro-optic crystal 10b, which has three serially located pairs of electrodes disposed on a surface thereof. The first of these pairs, consisting of spaced parallel electrodes 44 and 45, defines a dielectric region 46 therebetween having a first given relatively narrow width. A third of these pairs, consisting of spaced parallel electrodes 47 and 48, defines a dielectric region 49 therebetween having a second given relatively wide width. The second of these pairs of electrodes, which couples the first pair of the third pair, consists of spaced electrodes 50 and 51 which are non-parallel to each other and, as shown, define a dielectric region 52 therebetween which has the first given width at the upper end thereof in cooperative region which the first pair of electrodes, and then diverges therefrom to the lower end thereof, which is in cooperative relationship with the third pair of electrodes and has the second given width. By applying suitable voltages across each of the respective pairs of electrodes, the respective dielectric regions therebetween will operate as optical waveguides. However, the effective impedance of the waveguide formed by relatively narrow region 46 of the first pair of electrodes and the impedance of the waveguides formed by relatively wide region 49 of the third pair of electrodes are diferent from each other. The waveguide formed by diverging region 52 of the second pair of electrodes forms an impedance transformer for matching the impedance of region 46 with that of region 49.

By way of example, the optical waveguide impedance transformer of FIG. 4 may be employed to couple light wave energy between a relatively narrow fiber optic 53 in cooperative relationship with region 46 of the first pair of electrodes and a relatively wide fiber optic 54 in cooperative relationship with region 49 of the third pair of electrodes.

Referring now to FIG. 5, there is shown electro-optic crystal 10c, which has a pair of electrodes including a periodic structure disposed on a surface thereof. In particular, this pair of electrodes consists of parallel electrodes 55 and 56 defining a region 57 therebetween. Electrode 55 includes a plurality of protrusions 58, equally spaced along the length thereof, which extend into region 57. In a similar manner, electrode 56 includes a plurality of like protrusions 59. Corresponding ones of protrusions 58 and 59, as shown, are disposed in line with each other in a direction normal to electrodes 55 and 56.

When an appropriate voltage is applied across electrodes 55 and 56, region 57 operates as a waveguide for light wave energy applied as an input thereto, in the manner described above in connection with FIGS. 1 and 2. However, in the case of FIG. 5, due to the presence of the periodic structure defined by protrusions 58 and 59, the waveguide light energy does not propagate but reflects back, a wavelength related to the spacing along the length of region 57 between successive ones of protrusions 58 or protrusions 59 such that this spacing is substantially equal to an integral number of half wavelengths. Therefore, the arrangement of FIG. 5 is capable of operating as a reject filter.

What is claimed is:

1. Optical waveguide means for guiding given light wave energy, said waveguide means comprising a piece of electro-optic crystal, said crystal being substantially transparent to said given light wave energy, and a plurality of spaced electrodes disposed solely on a single surface of said crystal comprising at least one pair of spaced electrodes arranged in side-by-side relationship with respect to each other to define a region of said crystal therebetween, said plurality of spaced electrodes comprising all of the electrodes of said optical waveguide means, whereby the region of any pair acts as a waveguide for said given light wave energy in response to a suitable voltage being applied across that pair of spaced electrodes.

2. The optical waveguide means defined in claim 1, further including first means for applying an input beam of said given light wave energy to one end of said region and second means for extracting an output beam of said given light wave energy from the other end of said region.

3. The optical waveguide means defined in claim 2, wherein at least one of said first and second means includes an imaging lens having an image plane substantially coincident with that end of said region corresponding to said one of said first and second means.

4. The optical waveguide means defined in claim 3, wherein said image plane is the focal plane of said lens.

5. The optical waveguide means defined in claim 2, wherein at least one of said first and second means includes a fiber optic having one end thereof in cooperative optical relationship with that end of said region corresponding to said one of said first and second means.

6. The optical waveguide means defined in claim 1, further including a control signal source for applying a voltage across said electrodes, the depth of said region with respect to the surface of said crystal being a function of the voltage gradient between said electrodes.

7. The optical waveguide means defined in claim 1, wherein said plurality of spaced electrodes includes first, second and third separate and distinct ones of said pairs of spaced electrodes arranged with only one end of each of said first, second and third pairs within a particular area of said surface, and a switching section comprising first, second and third additional spaced electrodes located wholly within said particular area with said first additional electrode extending from said one end of one of said first pair to said one end of one of said second pair and with said second additional electrode extending from said one end of the other of said first pair to said one end of one of said third pair, said third additional electrode being situated intermediate said first and second additional electrodes in side-by-side relationship therewith and extending from said one end of the other of both said second and third pair to a point in between said one end of the electrodes of said first pair,
whereby light wave energy in said first pair may be switched either to said second or third pair in accordance with the respective relative potentials selectively applied to said first, second and third additional electrodes of said switching section.

8. The optical waveguide means defined in claim 7, wherein said first, second and third pairs of electrodes are oriented in a Y-shaped configuration and said third additional electrode has a triangular shape with one side thereof in cooperative relationship with said one end of the other of both said second and third pair and the apex of the angle of said triangular shape opposite to said one side at said point in between said one end of the electrodes of said first pair.

9. The optical waveguide means defined in claim 7, further including a control signal source for applying a reference potential to said third additional electrode, respective negative potentials to each of said one electrode of said first and second pairs and to said other electrode of said third pair, and respective positive potentials to each of said other electrode of said first and second pair and to said one electrode of said third pair, said control signal source further selectively applying a negative potential to said first additional electrode and said reference potential to said second additional electrode to thereby cause light wave energy in the region of said first pair to be switched into the region of said second pair or for selectively applying said reference potential to said first additional electrode and a positive potential to said second additional electrode to thereby cause light wave energy in the region of said first pair to be switched into the region of said third pair.

10. The optical waveguide means defined in claim 1, wherein said plurality of pairs of electrodes includes first, second and third pairs of electrodes disposed in serial relationship with each other with said second pair of electrodes extending from said first to said third pairs of electrodes, the electrodes of said first pair being substantially parallel to each other and spaced substantially a first given distance from each other, the electrodes of said third pair being substantially parallel to each other and spaced substantially a second given distance from each other which is greater than said first given distance, and the electrodes of said second pair diverging from each other from a first end thereof which is in cooperative relationship with one end of said first pair to the other end thereof which is in cooperative relationship with one end of said third pair, whereby said waveguide means is capable of transforming the mode of light wave energy from a first mode in the region of said first pair to a second mode in the region of said third pair.

11. The optical waveguide means defined in claim 10 further including a first relatively narrow fiber optic in cooperative relationship with the other end of said first pair and a second relatively wide fiber optic in cooperative relationship with the other end of said third pair.

12. The optical waveguide means defined in claim 1, wherein said pair of electrodes includes a periodic structure disposed along the length thereof.

13. The optical waveguide means defined in claim 12, wherein said pair of electrodes comprises a pair of substantially parallel spaced portions defining a region therebetween, and said periodic structure includes a plurality of protrusions attached to each of said portions and extending substantially perpendicular thereto into said region, said protrusions of each electrode of said pair being equally spaced along the length thereof.

14. The optical waveguide means defined in claim 13, wherein each respective protrusion of one electrode of said pair is aligned with a corresponding respective protrusion of the other electrode of said pair.

* * * * *